United States Patent [19]

Scoville

[11] 3,809,866

[45] May 7, 1974

[54] COMPUTING SYSTEM

[75] Inventor: John Tregay Scoville, Greensboro, N.C.

[73] Assignee: Gilbert & Barker Manufacturing Company, Greensboro, N.C.

[22] Filed: June 6, 1973

[21] Appl. No.: 367,476

[52] U.S. Cl............ 235/151.34, 235/92 FI, 222/33, 222/36
[51] Int. Cl........................... G06f 15/56, G06f 7/52
[58] Field of Search....... 235/151.34, 92 FI, 92 DM, 235/164; 222/33, 36, 37; 137/552.7; 73/195

[56] References Cited
UNITED STATES PATENTS

| | | | |
|---|---|---|---|
| 3,696,236 | 10/1972 | Kus................................. | 235/151.34 |
| 3,751,642 | 8/1973 | Todd et al. ...................... | 235/151.34 |
| 3,199,727 | 8/1965 | Romanowski......................... | 222/20 |
| 3,221,149 | 11/1965 | Giot et al................... | 235/151.34 X |
| 3,254,749 | 6/1966 | Scherer.................................. | 194/4 |
| 3,689,749 | 9/1972 | Johnston..................... | 235/151.34 X |
| 3,081,031 | 3/1963 | Livesay..................... | 235/151.34 X |

Primary Examiner—Malcolm A. Morrison
Assistant Examiner—Edward J. Wise
Attorney, Agent, or Firm—Tipton D. Jennings

[57] ABSTRACT

Embodiments of a computing system are disclosed which have particular utility in computing the cost of fuel, such as gasoline, as a function of the fuel volume dispensed. Specifically, the computer is designed to be free-running in that its cyclic generation of pulses representative of the established unit volume price of the fuel is independent of the volume of fuel which is actually dispensed or the rate of dispensing.

A pulser is used which generates a pulse for each incremental volume of fuel dispensed, and a synchronizing circuit receives and synchronizes each of the asynchronous pulses from the pulser with a cycle of the computer. Once synchronization occurs, the price pulses generated during that single computer cycle are passed to an accumulating counter and display device.

17 Claims, 6 Drawing Figures

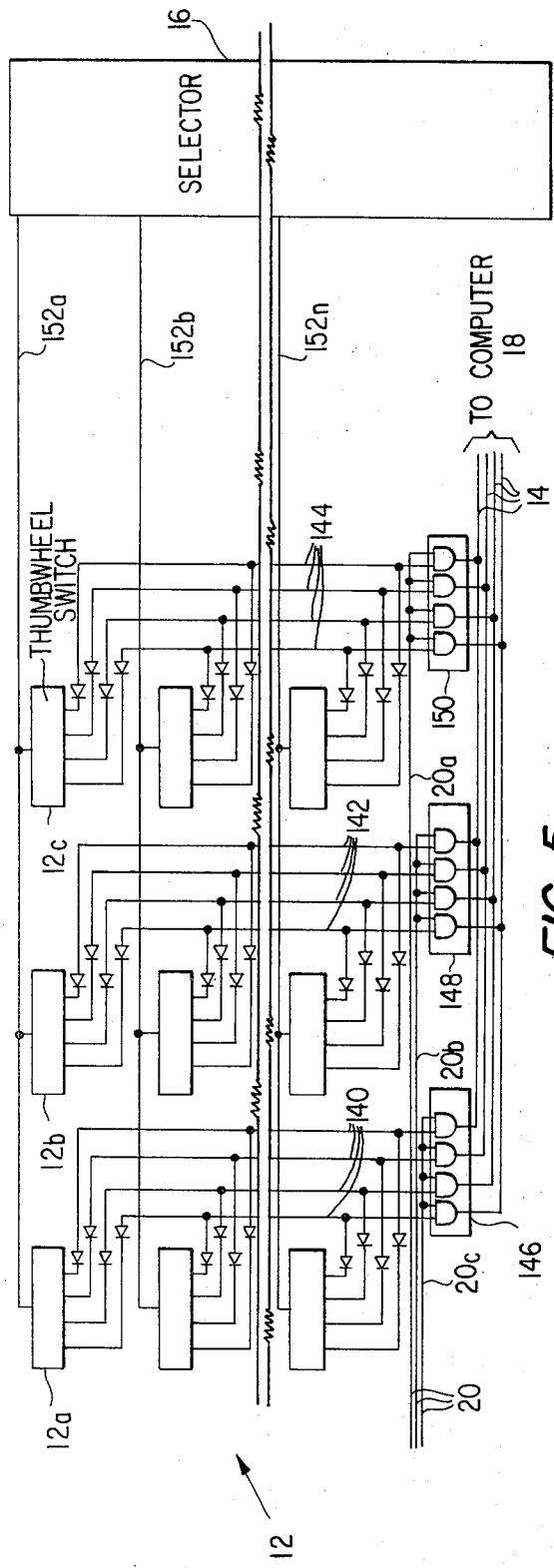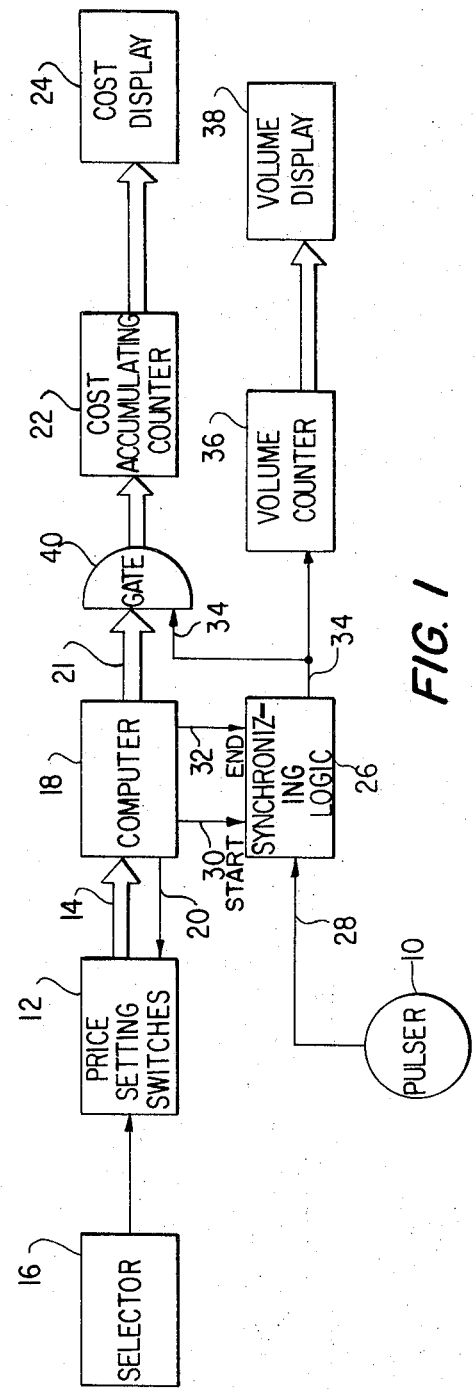

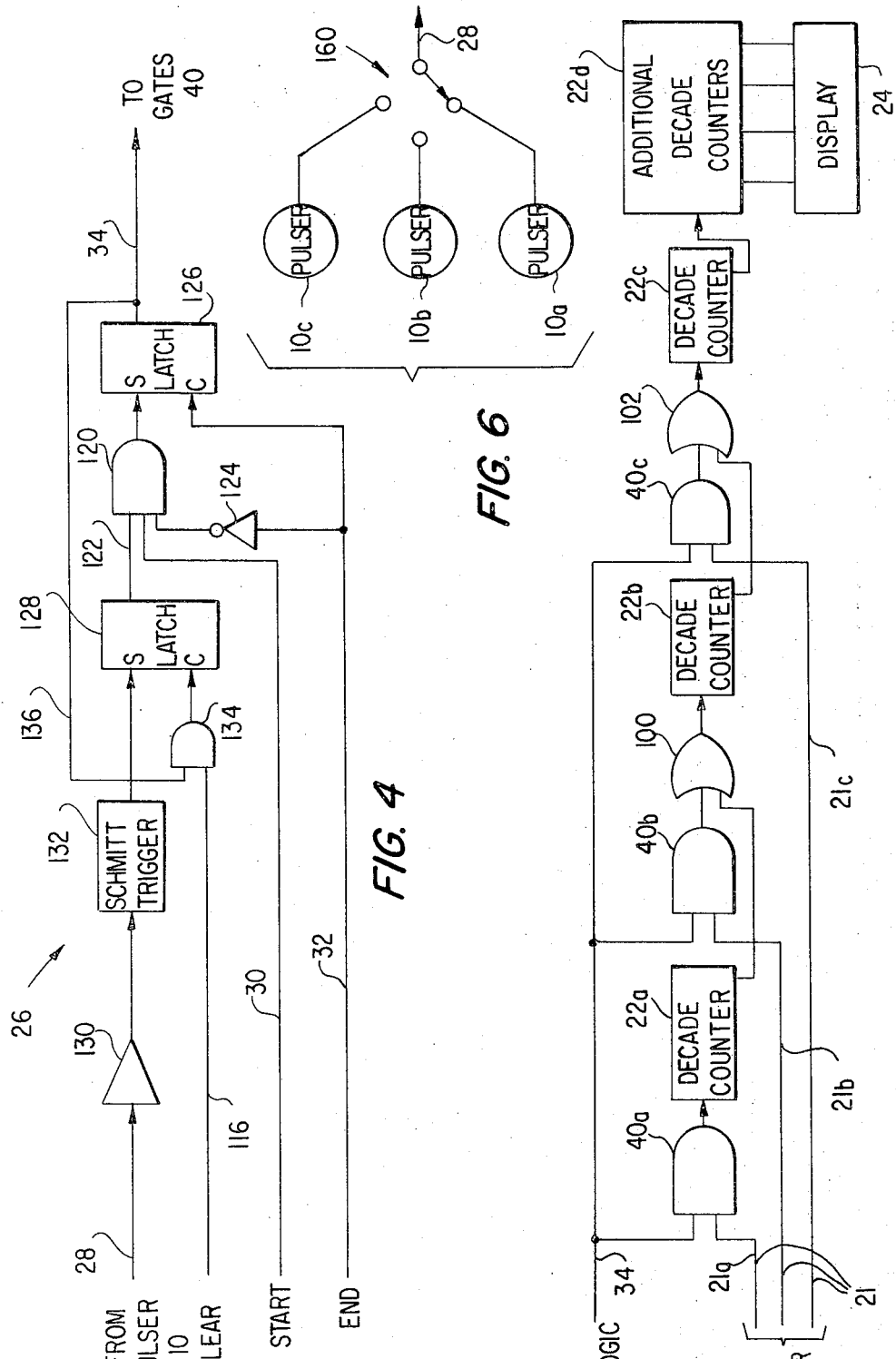

COMPUTING SYSTEM

BACKGROUND OF THE INVENTION

The present invention relates to a computing system having utility in the field of fuel dispensing, and particular utility in computing the cost of fuel, such as gasoline, as a function of the volume dispensed.

Computers or totalizers for fuel dispensers are well known. Mechanical computers have been used for years in gasoline dispensers or "pumps" in service stations. Such computers employ rather complex mechanisms which total and display cost and volume continuously as the delivery of gasoline proceeds. More recently, electronic computers have been introduced and are contained within the dispensers or positioned remotely therefrom. Typically, such computers are controlled by flow-meter operation so that for each incremental volume of gasoline dispensed, a preset number of pulses are caused to be generated in the computer and applied to a cost accumulating counter. Readout of the accumulating counter gives a cash display of the cost of dispensed gasoline. The preset number of pulses are commonly made equal to the unit selling price of the gasoline and are established on thumbwheel switches or similar programmable apparatus. Adaptations of these latter type of computers are disclosed in U.S. Pat. Nos. 3,678,253 and 3,696,236.

The prior-art electronic computers, as mentioned above, operate in response to volume increments of dispensed gasoline. A suitable transducer is driven by the flowmeter or associated gearing to generate a control pulse each time a unit incremental volume, e.g., 1/100 gallon, of gasoline is dispensed. Each control pulse is used to clock or cycle the computer so that it proceeds through a single operational sequence or cycle. During this cycle the computer generates and counts the aforementioned preset number of pulses, and it then returns to a standby or quiescent condition in anticipation of receipt of a subsequent control pulse.

SUMMARY OF THE INVENTION

The computing system of the present invention runs continuously during dispensing in contrast to the start/stop operation of prior-art fuel-dispensing computers. This free-running concept eliminates dependency upon incremental-volume dispensing for initiation of computer operation and results in a more versatile computing system. Thus, one computing system can be used with a single product dispenser or with a blender where only one pulser is used to generate incremental volume pulses, or with a multiproduct dispenser where several products share the same computing system and a separate pulser is provided for each product. In each case, it entails the same synchronization of an electrical volume-responsive pulse with an independently cycling computer, and the gating of a cost accumulating counter to receive the computer output for one cycle. Additionally, it is easier to perform maintenance upon and validate the performance of a continuously-operating system.

To achieve the objects and advantages of the invention, and in accordance with its purposes, as embodied and broadly described herein, this invention comprises in combination a computing system in which there are means for generating a pulse in response to each incremental volume of fuel dispensed, variable means for establishing a unit volume price for the fuel and providing an electrical signal representative of such established price, and a cost accumulating counter for totaling the cost of dispensed fuel, and in which the inventive improvement comprises a continuously-cycling computer responsive to the electrical signal from said establishing means for generating during each cycle output pulses representative of the established unit volume price, means for synchronizing each pulse generated in response to the dispensing of an incremental volume of fuel with a cycle of said computer, and means responsive to said synchronizing means for permitting the output pulses to pass to said cost accumulating counter during each operational cycle when synchronization occurs.

Preferably, the computer includes means for generating a signal at the start of each cycle and means for generating a signal at the end of each cycle, and said synchronizing means includes a coincidence circuit connected to be responsive to said start signal and to an incremental volume pulse, a first bistable device connected to the output of said coincidence circuit to be set in a first state at the beginning of a computer cycle and connected to receive the end signal to be set in a second state at the end of a computer cycle.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The invention consists in the novel circuits, parts, constructions, arrangements, combinations and improvements shown and described. The accompanying drawings, which are incorporated in and constitute a part of this specification, illustrate embodiments of the invention and, together with the description, serve to explain the principles of the invention.

BRIEF DESCRIPTION OF THE DRAWINGS

FIG. 1 is a block diagram of a preferred embodiment of an improved system for computing the total cost of dispensed fuel as a function of the unit volume price and the volume dispensed;

FIG. 3 is a logic diagram of the cost accumulating counter and input gates shown in FIG. 1;

FIG. 4 is a logic diagram of the synchronizing circuit shown in FIG. 1;

FIG. 5 depicts the selector and price-setting switches, shown in FIG. 1, in logic and block diagram form; and FIG. 6 is a modification of the pulser portion of the block diagram of FIG. 1 showing the use of a plurality of pulsers.

DETAILED DESCRIPTION OF THE PREFERRED EMBODIMENTS

Figure 2:
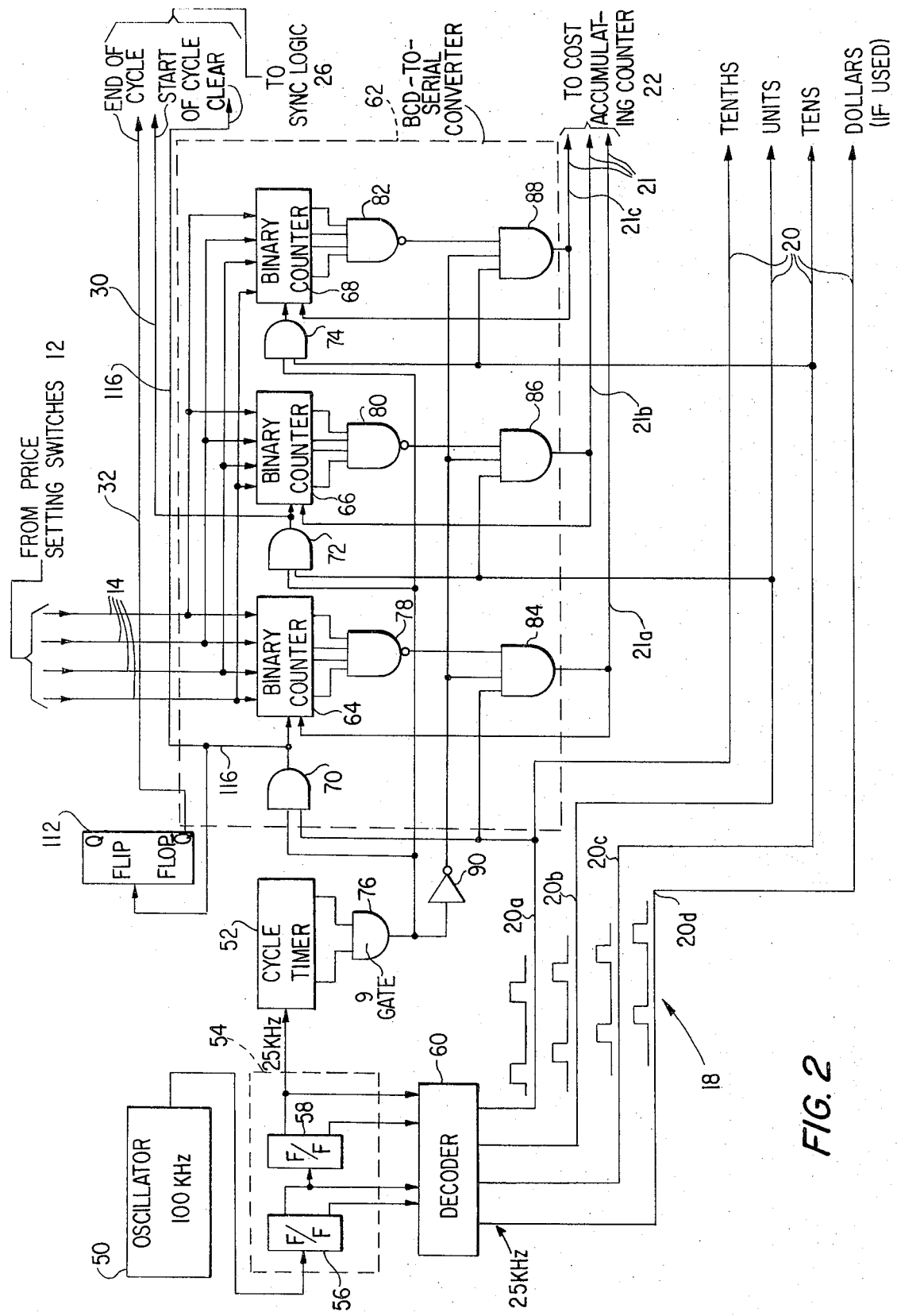
FIG. 2 is a logic diagram of the continuously-cycling computer shown in FIG. 1.

Reference will be made in detail to the present preferred embodiments of the invention, example of which are illustrated in the accompanying drawings. As an aid in understanding the construction and operation of the invention reference will be made to the dispensing of gasoline when appropriate.

Referring now to FIG. 1, there is shown a block diagram of a system for computing the total cost of dispensed fuel as a function of the unit volume price of the fuel and the volume dispensed. The system includes means for generating a pulse in response to each incremental volume of fuel dispensed. As here embodied, this pulse generating means consists of a pulser 10 which provides a pulse train output as gasoline is dispensed, with each pulse representing the dispensing of a predetermined volume increment. As an example, the volume increment can be one-thousandth of a gallon, and one thousand pulses are therefore generated for each gallon of gasoline which is dispensed. The pulser is usually housed within the gasoline dispenser and is coupled to a conventional flowmeter (not shown). In the case of a blending dispenser, the pulser is coupled to be driven by a differential or other types of blend gearing, all in a well known manner.

The computing system also includes variable means for establishing a unit volume price for the fuel and providing an electrical signal representative of the established price. As embodied herein, the variable establishing means includes at least one bank of price setting switches 12 having typically three price setting switches in each bank for setting the unit volume price for each of the gasoline products or blends which can be dispensed. Preferably, each price setting switch is a conventional thumb-wheel switch (not shown) which can be set to any of the digits 0–9. The three switches in each bank provide a binary-coded-decimal (BCD) electrical output 14 representative of the price established by that switch bank. In a blender or multi-product dispenser, where there are more than one bank of price setting switches employed, the switch banks are individually selected by a selector 16 in accordance with the particular blend or product chosen. The BCD output 14 is provided for only the switch bank which has been selected.

In accordance with the invention, there is provided a continuously-cycling computer responsive to the electrical signals from the establishing means for generating during each cycle output pulses representative of the established unit volume price. As here embodied, computer section 18 in the computing system is connected to receive the output of price setting switches 12 via line 14. Computer 18 is also connected to the switches 12 by a line 20 to activate the selected bank of price setting switches during the operation of the computing system. The output of computer 18 is applied by lines 21 to a cost accumulating counter 22 which totals the cost of the dispensed fuel. A display 24 is connected to the output of counter 22 to indicate visually the cost of dispensed fuel.

In accordance with the invention, means are provided for synchronizing each pulse generated in response to the dispensing of an incremental volume of fuel with a cycle of the computer. As here embodied, synchronizing logic 26 is connected to receive the pulse train from pulser 10 via line 28. Synchronizing logic 26 also receives from computer 18 a signal at the start of each cycle on line 30 and a signal at the end of each cycle on line 32. The output of synchronizing logic 26 is applied by line 34 to a conventional volume counter 36 whose output in turn is connected to a volume display 38 for providing a visual indication of the total volume of gasoline which is dispensed.

In accordance with the invention, there are means provided responsive to the synchronizing means for permitting the output pulses of the computer to pass to the cost accumulating counter during each operational cycle when synchronization occurs. As here embodied, the permitting means comprises a plurality of coincident gates 40 connected in line 21 between the output of continuously-cycling computer 18 and the input of cost accumulating counter 22. Another input to gates 40 is provided by the output of the synchronizing means on line 34. This output of synchronizing logic 26 enables gates 40 during each operational cycle of the computer so that the computer output pulses can pass through gates 40 into counter 22.

It will be assumed that the computing system shown in FIG. 1 is associated with a blender. Before the commencement of gasoline delivery, selector 16 is manipulated to activate the desired bank of price setting switches 12. As gasoline is dispensed, computer 18 continuously cycles at its own rate independently of the quantity of gasoline dispensed or the dispensing rate. At the start of each computer cycle, an enabling signal is transmitted to the switches 12 via line 20 to load the BCD signals from the output of the selected switch bank into the computer 18. During each cycle, computer 18 generates a train of pulses equivalent to the unit volume price of the activated switch bank and applies these pulses to gates 40. Computer 18 also provides a pulse on line 30 to synchronizing logic 26 at the start of the cycle and a pulse on line 32 at the end of the cycle.

Each time that pulser 10 emits a pulse in response to the dispensing of an incremental volume of gasoline, this electrical pulse is applied to synchronizing logic 26 and is there synchronized with the start and end pulses of a computer cycle to enable gates 40 for one computer cycle only. During this cycle, the price pulses generated by computer 18 pass through gates 40 and are applied to cost accumulating counter 22. At the end of this computer cycle, gates 40 are caused to close by the removal of the enabling signal from line 34. No further price pulses can pass to counter 22, even though computer 18 continues to cycle, until the next pulse is applied by pulser 10 to the synchronizing logic circuit 26 and synchronization is again established.

As dispensing continues and more volume-responsive pulses are applied in series to synchronizing logic 26, synchronization occurs and gates 40 are enabled in response to each such pulse to let one burst of price pulses pass to accumulating counter 22. When gasoline dispensing ends, the count which has been accumulated in counter 22 is representative of the actual cost of the gasoline which has been delivered. Each enabling pulse generated by synchronizing logic circuit 26 during dispensing is also applied to volume counter 36 to totalize the incremental volumes which are dispensed. The final count in volume counter 36 is representative of the amount of gasoline which has been dispensed. Cost display 24 and volume display 38 provide a readout of the actual cost and volume of the gasoline dispensed, respectively.

FIG. 2 is a logic diagram of the computer 18 shown in FIG. 1. As embodied herein, the computer comprises a free-running oscillator 50 which preferably provides an output pulse frequency of 100 KHz. A computer cycle timer 52 is connected to be responsive to the output of oscillator 50 to establish each operational cycle of the computer. Cycle timer 52 is preferably a decade scaler which counts from zero to nine and then returns to zero to begin the next count. Timer 52 operates continuously in response to the pulses applied to its input and thus provides a series of timed cycles, with each cycle having a duration of ten input pulses. In the present description, each cycle is designed to begin during the count of nine and terminate at the end of the count of eight. The 100 KHz frequency of oscillator 50 is preferably divided by scaler 54 to an operational frequency of 25 KHz. Scaler 54 is a divide-by-four scaler which is connected to the output of oscillator 50 and formed of two binary circuits or flip-flops 56 and 58 connected in tandem. The output pulse train of scaler 54 is applied to the input of cycle timer 52.

As embodied herein, computer 18 further comprises a decoder 60 connected to the four outputs of scaler 54. As shown, these outputs are provided by the flip-flops 56 and 58. Decoder 60 is of a conventional construction and provides a plurality of output pulse trains here shown as four in number. Each is at the operational frequency of 25 KHz but noncoincident in time with the other three pulse trains. During each count of cycle timer 52, a pulse appears in sequence on each of the four output lines 20 of decoder 60. Preferably, a pulse first appears on line 20a coincident with the start of the count. This pulse subsides and is followed by a pulse on line 20b, which is then followed by a pulse on line 20c, and then by a pulse on line 20d which ends coincident with the end of the single count of cycle timer 52. Thus, during each of the ten counts of a computer cycle, decoder 60 will emit four pulses in sequence, one on each of the lines 20 and none of which overlap or coincide with any of the other three pulses.

Computer 18 further comprises a counter 62 which functions as a BCD-to-serial converter. Counter or converter 62 is responsive to the output of cycle timer 52 so that it is loaded at the start of each cycle with the electrical signal representative of the established unit volume price. Preferably, converter 62 includes a plurality of binary counters 64, 66 and 68. BCD signals for each place in the selected unit volume gasoline price are supplied from the selected price setting switches 12 (FIG. 1) to the input of the binary counters so that each is loaded by one of the BCD signals. Loading is accomplished by means of AND gates 70, 72 and 74 connected to the Load inputs of binary counters 64, 66 and 68 respectively.

As mentioned previously, a computer cycle begins at the nine-count of cycle timer 52. An AND gate 76 is connected to the output of cycle timer 52 so that it becomes activated during the nine-count. The output of AND gate 76 is connected to one input of each of the loading gates 70, 72 and 74 so that these gates become enabled during the nine count.

The binary counters 64, 66 and 68 are sequentially loaded at the start of each computer cycle by decoder 60. For purposes of discussion, it will be assumed that binary counter 64 is loaded with the least significant digit of the unit volume price, here being tenths of a cent. AND gate 70 has its second input connected to line 20a. Thus, binary counter 64 is first loaded at the start of a computer cycle by a pulse being applied from line 20a through the enabled AND gate 70 into the Load input of binary counter 64. As will be explained hereinafter, the BCD input arriving on lines 14 comes from the activated price setting switch which is set to tenths of a cent and this input is loaded into binary counter 64.

After binary counter 64 has been loaded, a pulse appears on line 20b out of decoder 60 and passes through enabled gate 72 to load binary counter 66 with the BCD signals corresponding to the units or cents digit of the activated price setting switch bank. Next, binary counter 68 is loaded by a pulse from line 20c via enabled gate 74. The information loaded into binary counter 68 is provided by line 14 and is the BCD signal from the activated price setting switch set to tens of cents. The converter 62 is now loaded and ready to be read out during the next nine counts of the computer cycle. Line 20d out of decoder 60 is not shown as used to load a binary counter in order to simplify the present description. However, it should be understood that were the price setting switches settable to four digits, the fourth, for example, being the dollars digit, then the pulse on line 20d would be applied to load a fourth binary counter in the same manner as explained above.

Each of the binary counters in converter 62 can be designed to be loaded with either a straight binary number or with a straight binary complement of such number. Preferably, the counters herein are loaded with the latter. This binary complement can be obtained from the price setting switches 12 which can be constructed to provide an output in the straight binary complement of the number set on each switch. Alternatively, the price setting switches can be constructed to produce a straight binary signal of the switch setting and in this case each of the binary counters 64, 66 and 68 in converter 62 converts the straight binary number into its complement in a conventional manner so that the complement is loaded. For example, assuming that the price per gallon of the selected switch bank is 39.6 cents per gallon, then during the loading operation, the binary complement of six is loaded into binary counter 64, the binary complement of nine is loaded into binary counter 66, and the binary complement of three is loaded into binary counter 68.

As embodied herein, computer 18 includes a coincidence gate connected to the output of each of the three binary counters in converter 62. These gates are identified by numerals 78, 80 and 82. Each gate receives four inputs from the output of its respective binary counter. These three coincidence gates are preferably NAND gates in which the output normally is True. When four True signals are applied to its input, its output goes False.

Computer 18 further includes means responsive to oscillator 50 for providing output pulses from the computer during each computer cycle and also for advancing the counter or converter 62. As embodied herein, such providing means includes three AND gates 84, 86 and 88 each of which is connected to the output of one of the three binary counters via AND gates 78, 80 and 82, respectively, and to the one of the outputs of decoder 60. The output of each of the three gates 84, 86 and 88 are connected to lines 21 to provide the output pulses from the computer to the cost accumulating counter 22 (FIG. 1). Preferably, gate 84 is connected to line 21a to provide output pulses representative of tenths of a cent; gate 86 is connected to line 21b to provide pulses representative of units of cents; and gate 88 is connected to line 21c to provide pulses representative of tens of cents. Thus, during each computer cycle, using the illustrative 39.6 cents per gallon cost figure, three pulses are applied to line 21c, nine pulses are applied to line 21b and six pulses are applied to line 21a in the manner to be described hereinafter.

Each of the AND gates 84, 86 and 88 has an additional input connected to the output of gate 76 via inverter 90. Inverter 90 applies a False signal during the nine-count of the cycle when the converter 72 is being loaded with the BCD signals. This is to insure that these three gates are disabled at that time to avoid the inadvertent generation of an output pulse during the loading sequence. During other than the nine-count, the output of inverter 90 is True and these three AND gates are free to function in the normal manner to provide the predetermined number of output pulses.

In operation, the binary counters 64, 66 and 68 are first cleared of all previous states in a known manner just prior to loading. The BCD complement of the activated price setting switches are now loaded into these counters during the ninth count of the computer cycle timing period as described previously. Cycle timer 52 is now advanced to the zero count by a pulse from scaler 54, and the loading gates 70, 72 and 74 become disabled by a False signal from gate 76. At the same time, the output of inverter 90 goes True. Additionally, the output of AND gates 78, 80 and 82 are all True for the exemplary price per unit gallon chosen, and AND gates 84, 86 and 88 are enabled.

A pulse is now applied by line 20a to AND gate 84 and finding this gate enabled, passes through this AND gate onto line 21a and out to the cost accumulating counter 22. This same output pulse is also applied back up to binary counter 64 to advance this counter one count. Next, while still in the zero count of cycle counter 52, a pulse is applied to AND gate 86 via line 20b and it passes onto line 21b and out to counter 22. This output pulse is also applied up to binary counter 66 to advance this counter one count. Similarly, the next pulse out of decoder 60 is on line 20c and this is applied through AND gate 88 to pass to the cost accumulating counter 22 via line 21c, and up to binary counter 68 to advance this last counter one count. When the zero count of the cycle is completed, cycle timer 52 is advanced to the one-count by a pulse from scaler 54 and pulses are again applied in sequence to the enabled AND gates 84, 86 and 88 via lines 20. The output pulses which appear on lines 21 are again passed to the cost accumulating counter 22 and also advance each of the three binary counters in converter 62 one count.

The computer cycle ends and the next cycle begins at the end of the eighth count. By that time, six output pulses have been provided on line 21a, nine output pulses on line 21b and three output pulses on line 21c. The count of each of the binary counters 64, 66 and 68 has been advanced to binary fifteen where all outputs are True. The outputs of the three NAND gates 78, 80 and 82 are thus False, and the AND gates 84, 86 and 88 are disabled.

In the case of binary counter 64 which was loaded to the binary complement of the digit 6, i.e. binary 9, it reached its maximum count of binary 15 in response to the sixth pulse being generated at AND gate 84. At that time, all outputs of counter 64 became True causing the output of NAND gate 78 to go False, disabling AND gate 84. Thus, no additional pulses passed through AND gate 84 during the remainder of the computer cycle. Similarly, binary counter 68 was advanced to its maximum count by the generation of three output pulses from AND gate 88. The output of NAND gate 82 went False at that time, disabling AND gate 88 from passing further pulses during the remainder of the computer cycle. Binary counter 66 was set to the binary complement of 9, i.e. binary 6, and AND gate 86 remained opened for all nine counts of the computer cycle, following the load count, in order to provide nine output pulses on line 21b. Thus, binary counter 66 reached its maximum count during the eighth count of cycle timer 52 just prior to the end of the computer cycle. At that time the output of NAND gate 80 went False, disabling AND gate 86.

As has been explained, three pulse trains, representative of the established unit volume price, are generated during a computer cycle. These generated pulses are sent to the cost accumulating counter 22. As soon as one cycle ends, the binary counters 64, 66 and 68 in converter 62 are cleared and are again loaded to the BCD complement of the activated price setting switch. During this new cycle, the computer 18 again functions in the manner just described to provide the three pulse train outputs representative of the established unit volume price. As long as oscillator 50 continues to operate, the computer 18 will continuously cycle and generate these output pulses during each cycle.

With reference now to FIG. 3, the cost accumulating counter is shown embodied here as a plurality of counting stages 22a, 22b, 22c and 22d. Preferably, these counting stages are decade counters connected in series. The coincidence gates 40a, 40b and 40c are selectively connected to the input of decade counters 22a, 22b and 22c respectively. One input to each of the coincidence gates 40 is applied by line 34 coming from the synchronizing logic 26 (FIG.1). The second input to each of these gates is applied via lines 21. Preferably, line 21a is connected to the input of gate 40a whose output is connected into the first decade counter 22a. Line 21b is connected into gate 40b and line 21c is connected into gate 40c. At the right-hand side of FIG. 3, display 24 is again shown connected to the output stages of accumulating counter 22 to provide a visual indication of the cost of the gasoline dispensed.

An OR gate 100 is provided between decade counter 22a and decade counter 22b. The inputs to OR gate 100 are taken from the outputs of gate 40b and decade counter 22a. The output of OR gate 100 is connected to the input of decade counter 22b. Similarly, an OR gate 102 is connected to receive the outputs of decade counter 22b and AND gate 40c. The output of OR gate 102 is connected into decade counter 22c. The purpose of OR gates 100 and 102 is to pass either the carry pulse from the preceding counter stage to the next stage or to pass a pulse applied directly from computer 18.

As previously described, the continuous cycling of computer 18 causes the generation and application of output pulses onto lines 21. However, counter 22 cannot accept these pulses unless and until pulser 10 (FIG. 1) has emitted a pulse and this pulse has been synchronized with a computer cycle in synchronizing logic 26. Assuming now that such synchronization has occurred, line 34 goes True for one computer cycle. Gates 40a, 40b and 40c become enabled, and the pulses appearing on each of the three lines 21a, 21b and 21c are applied through these enabled AND gates and into decade counters 22a, 22b and 22c respectively. At the end of this one computer cycle, line 34 returns to a False state disabling the three input AND gates 40. Line 34 remains in this False state until pulser 10 subsequently emits another pulse and it too becomes synchronized in logic circuit 26. At such time, line 34 again goes True for one computer cycle to permit the pulses generated by the computer during such cycle to pass through gates 40 into counter 22.

Decade counters 22a, 22b and 22c are arranged serially from the least significant to the most significant digit of the unit prices set on the price setting switches 12. The application of pulses in parallel to the appropriate decade counters in accordance with the order of their significance accomplishes the same result as applying serial pulses (e.g., 396 pulses for the setting of 39.6 cents per gallon) to the first decade counter 22a in the counting chain, and does so in a small fraction of the time. Oscillator 50 can run at a much lower frequency, yet the generation and counting of pulses during each cycle is precisely and simply performed and well within the minimum time between adjacent pulses that can be applied by pulser 10. Because the pulses from computer 18 are applied in parallel in a staggered or out-of-phase manner to the three input counting decades 22a, 22b and 22c, the output of decades 22a and 22b can apply a carry pulse at the count of 10 to the next decade counter in the chain through the appropriate OR gate 100 or 102 without any chance of the carry pulse coinciding with a directly applied pulse from the computer. Thus, there is no likelihood that either a carry pulse or a directly applied pulse can be lost through interference with one another.

Assuming again a selected unit price of 39.6 cents per gallon and a pulser rate of 1,000 p.p.g., the pulses applied by computer 18 to the cost accumulating counter 22 during each cycle when line 34 is True have a total value of 396/1000 cents. If a thousand pulses (i.e., 1 gallon) are generated by pulser 10 during the delivery of gasoline, the accumulated value in counter 22 is 39.6 cents and this amount is indicated at display 24. If 10,000 pulses (i.e., 10 gallons) are generated during gasoline delivery, the accumulated value in the counter is $3.96 and this is displayed at 24. As a further example, if 16.3 gallons are delivered, 16,300 pulses are generated and the equivalent of 396 pulses are applied to counter 22, 16,300 times during gasoline delivery. The value which is totalized or accumulated in counter 22, is $6.45 rounded off to cents and this is displayed on display 24. As can be seen, counter 22 accumulates and display 24 indicates the total cost of dispensed gasoline as a function of the unit volume price of the gasoline and the actual volume which is dispensed during gasoline delivery.

With reference again to FIG. 2 and also to FIG. 4, showing the logic circuit of synchronizing logic 26, the synchronizing of an asynchronous pulse from pulser 10 and a cycle of computer 18 will now be described. In accordance with the invention, the computer includes means for generating a signal at the start of each computer cycle and means for generating a signal at the end of each cycle. As embodied herein, the start signal generating means includes line 30 connected to the output of AND gate 72 in converter 62. As was previously described, AND gate 72 is enabled by the gate 76 during the nine-count of a computer cycle. During the nine-count, a pulse appears on line 20b and this pulse passes through AND gate 72 to load binary counter 66. This same pulse is also applied on line 30 and is passed to synchronizing logic 26 to indicate the start of a computer cycle.

As embodied herein, the end signal generating means includes a bistable circuit 112 and an output line 32 on which the end-of-cycle signal is applied to synchronizing logic 26. The output of AND gate 70 in converter 72 is connected by line 116 to the input of circuit 112 to toggle or clock this circuit between its two states. Preferably, bistable circuit 112 is a flip-flop and its $\bar{Q}$ output is connected to line 32. In operation, cycle timer 52 receives a pulse from scaler 54 to end the eighth count and begin the ninth count. Gate 76 goes True enabling AND gate 70. At the same time, a pulse is applied by line 20a to AND gate 70, and it passes through this AND gate to toggle flip-flop 112. Assuming that the Q output of flip-flop 112 was True and $\bar{Q}$ was False, the toggling of this flip-flop causes it to change states so that $\bar{Q}$ now becomes True and the Q output goes False. A True signal is applied on line 32 to the synchronizing logic 26 to indicate the end of a cycle. The True signal on line 116 which is used to toggle flip-flop 112 is also applied to the synchronizing logic 26 as a Clear pulse.

In accordance with the invention, the synchronizing means includes a coincidence circuit connected to be responsive to the start signal and to an incremental volume pulse. As embodied herein, the coincidence circuit includes AND gate 120 having one input connected to line 30 and a second input connected to line 122. A third input of AND gate 120 is connected to line 32 via inverter 124.

In accordance with the invention, a first bistable device is connected to the output of AND gate 120 so that is it set in a first state at the beginning of a computer cycle, and is also connected to receive the end signal to be set in a second state at the end of a computer cycle. As embodied herein, the output of AND gate 120 is connected to the Set input of latch 126. The Clear input of this latch is connected to line 32. Latch 126 is preferably a flip-flop and its output is connected to line 34. Whenever latch 126 is set, line 34 goes True and enables the coincidence gates 40 (FIG.3) for the passage of output pulses from computer 18 to the selected stages of counter 22.

As embodied herein, the synchronizing logic 26 has a second bistable device, here shown as latch 128, which is designed to be set to its first state by the incremental volume pulse from pulser 10. The output of latch 128 is connected to line 122 and this line applies a True signal to the input of AND gate 120 whenever latch 128 is set. Latch 128 is preferably a flip-flop.

Amplifier 130 is provided at the input of synchronizing logic 26 for the purpose of filtering any ambient noise or similar undesirable transients which may have collected on an applied pulse during its travel from the pulser 10 to logic circuit 26. The output of amplifier 130 is applied to the input of a Schmitt trigger 132. The purpose of the Schmitt trigger is to shape the input pulse to provide a fast rise time at its leading edge. The output of Schmitt trigger 132 is applied to the Set input of latch 128. An AND gate 134 is connected to the Clear side of latch 128. There are two inputs for AND gate 134, one being line 116 by which the Clear pulse is supplied from computer 18, and the other being feedback line 136 which is connected to the output of latch 126.

The pulses being applied by pulser 10 on line 28 are applied asynchronously with respect to the start of the cycles of free-running computer 18. As each incremental unit of gasoline is dispensed, logic circuit 26 must synchronize with the computer in order that the output pulse trains generated by the computer can be gated into cost accumulating counter 22 for one cycle. The start signal and the end signal are generated by the computer during each cycle and applied to logic circuit 26 for the purpose of synchronization. When a pulser pulse arrives on line 28, it is filtered at amplifier 130 and shaped at Schmitt trigger 132, and then applied to latch 128. This latch is set and line 122 goes True. Assuming that flip-flop 112 (FIG. 2) is Set so that line 32 is False, a True signal is being applied by inverter 124 to AND gate 120. Coincidence between the pulser input and the computer is established when a start pulse is applied on line 30 during the nine-count of cycle counter 52. This pulse finds gate 120 enabled and passes through this gate to set latch 126. Output line 34 goes True to open the gates 40 at the input to the cost accumulating counters 22.

Line 34 stays True for only one computer cycle, because at the end of that cycle, gate 76 at the output of cycle counter 52 (FIG. 2) goes True enabling AND gate 70. A pulse is applied by line 20a through AND gate 70 to toggle flip-flop 112. The Q̄ output of this flip-flop goes True and a true signal is applied on line 32 to clear latch 126. Line 34 goes False to disable AND gates 40 in counter 22. Line 34 stays False preventing further computer output pulses from reaching the inputs of counter 22 until a subsequent pulse is generated by pulser 10 and synchronization is again established in synchronization logic 26.

Latch 128 is cleared by a pulse on line 116 which passes through enabled gate 134 just prior to latch 126 being cleared. At that time, the signal on feedback line 136 is True. The purpose of line 136 and gate 134 is to insure that latch 128 cannot be cleared until synchronization has occurred and latch 126 is Set. Otherwise, a Clear pulse could clear latch 128 before latch 126 became set, and the incremental volume pulse stored in latch 128 would in effect be lost because it would not have performed its function of admitting computer pulses to cost accumulating counter 22.

Because the incremental volume pulses are applied asynchronously, latch 128 can stay set for a duration of up to almost two computer cycles before synchronization occurs. Using the extreme example, if the pulse from pulser 10 arrives just after flip-flop 112 (FIG. 2) has been toggled to a set state and the start pulse on line 30 has subsided, the next start pulse does not arrive until the beginning of the next computer cycle. At the beginning of the next cycle, flip-flop 112 is toggled clear and its output line 32 goes True. Inverter 124 goes False and disables AND gate 120 so that the start pulse cannot pass through. However, at the start of the third cycle, the output of the inverter 124 goes True, and a start pulse on line 30 can now pass through AND gate 120 to set latch 126. Synchronization finally occurs. Nevertheless, even in this extreme case, the incremental volume pulse remains stored in latch 128 without fear of a second pulse being generated by pulser 10 and applied to the sync circuit 26. This is because the oscillator 50 in the computer is selected to run at a frequency that is sufficiently faster than the maximum rate of pulser 10 to permit the computer to cycle several times if necessary before synchronization occurs and still have sufficient time remaining to pass the computer output to counter 22 before the next pulse is generated by pulser 10.

It may be desirable in certain situations to have the output of the computer applied to the cost accumulating counter for more than one cycle following synchronization. For example, if the rate of the pulser is not an even power of ten but is somewhere between, e.g., 500 pulses per gallon, by letting the computer cycle twice for each pulser pulse, an effective rate of 1,000 pulses per gallon is obtained. In this manner the decade counters in the cost accumulating counter 22 process the computer pulses in the normal manner, without the necessity of adding special dividing or multiplying circuitry to the counting chain as is sometimes done to obtain an accurate readout of the actual gasoline delivered. Such modification of the synchronizing logic is within the scope of this invention and the recited claims.

In FIG. 5, a logic and block diagram of selector 16 and price setting switches 12 is presented. The switches 12 are shown embodied in a matrix having a plurality of switch banks or rows with three thumbwheel switches in each bank, e.g., switches 12a, 12b and 12c. As stated earlier, each individual switch is preferably a conventional thumbwheel switch that provides a visual indication of the number to which it is set, and has a mechanical device such as a push button for selectively setting the switch to any desired number between zero and nine, inclusive. Each bank of price switches establishes a unit volume price for one of the products or blends of gasoline which can be dispensed.

The three switches in each bank have their outputs connected in parallel to switch output lines 140, 142 and 144, respectively, to form the columns of the matrix. Diodes are provided in the output lines of each switch to prevent feedback between the plurality of banks employed here. The output lines 140, 142 and 144 terminate at AND gates 146, 148 and 150, respectively. For ease of description, the column on the left shall be considered as containing the switches representing the most significant digit in the three-digit price settings and the column on the right as the lease significant digit.

Lines 20 are connected as the second input to each of the AND gates 146, 148 and 150. Preferably, line 20a is connected to gates 150; line 20b is connected to gates 148; and line 20c to gates 146. The output lines of these three gates are connected together to form lines 14 which are connected into converter 62 of the computer 18 (FIG. 2).

Selector 16 is embodied here as a block having a plurality of output lines 152a, 152b, - - - 152n, equal in number to the number of switch banks. Each output line is connected to the input of all three switches in one bank. Selector 16 can be of any suitable construction, and is typically a dial by which any one switch bank can be individually selected by rotation of the dial to the desired bank position. In so doing, a predetermined potential, such as ground, is applied to the selected switch bank only.

Assume that the uppermost switch bank in FIG. 5 is set to 39.6 cents per gallon, and selector 16 is manipulated to apply ground to line 152a. Switches 12a, 12b and 12c apply a BCD output into AND gates 146, 148 and 150, via lines 140, 142 and 144, respectively. During the nine-count of the computer cycle, a pulse is first generated by decoder 60 (FIG. 2) on line 20a which is applied to AND gates 150 and also to converter 62. Signals, which are the straight binary equivalent of the setting of switch 12c, are sent out from gates 150 on lines 14, and this binary signal is applied to converter 62 where they are loaded into binary counter 64. Next, a pulse is generated onto line 20b and gates the binary equivalent of switch 12b from AND gates 148 into converter 62 where binary counter 66 is loaded with that binary number. The pulse on line 20c is next generated and applied to AND gates 146. Binary signals equivalent to the setting of switch 12a are gated onto lines 14 and these are applied to converter 62 for loading into binary counter 68. With converter 62 now loaded, its binary counters are now advanced during the remainder of the cycle, as previously described, as the output pulses are generated by computer 18. At the end of the cycle, the counters are cleared and are again loaded in the manner just described to begin a new computer cycle.

In the construction of a blender, it is generally the practice to employ differentials and vairable gearing so that the blend proportions are established from the separate grades of gasoline in accordance with the blend chosen by the customer. The pulser 10 (FIG. 1) is typically coupled to the gearing so that it is accurately driven in relation to the volume of any blend which is being dispensed. In the case of a multiproduct dispenser where several different grades of gasoline are dispensed from the same dispenser without blending, it is commonly the practice to employ a separate pump and flowmeter for each product and to have one pulser for each flow-meter. Only one product can be dispensed at any one time, however, and only one pump, flowmeter and pulser can operate at any one time.

Each pulser in the multiproduct dispenser can be selectively connected into the computing system, as shown schematically in FIG. 6. As embodied herein, a plurality of pulses 10a, 10b and 10c are shown, the output of each being connected to a contact of switch 160. The output of switch 160 is connected to line 28 leading to synchronizing logic 26 (FIG. 1). The pulser which is selected by switch 160 is the one coupled to the active flowmeter, and this pulser applies its pulses to the synchronizing logic as the incremental volumes of gasoline are dispensed, for processing in the same manner as described hereinabove.

It will be apparent to those skilled in the art that modifications and variations can be made in the computing system of the present invention without departing from the scope or spirit of the invention.

What is claimed is:

1. In a system for computing the total cost of dispensed fuel as a function of the unit volume price of the fuel and the volume dispensed, including means for generating a pulse in response to each incremental volume of fuel dispensed, variable means for establishing a unit volume price for the fuel and providing an electrical signal representative of such established price, and a cost accumulating counter for totaling the cost of dispensed fuel, the improvement comprising a continuously-cycling computer responsive to the electrical signal from said establishing means for generating during each cycle output pulses representative of the established unit volume price, means for synchronizing each pulse generated in response to the dispensing of an incremental volume of fuel with a cycle of said computer, and means responsive to said synchronizing means for permitting the output pulses to pass to said cost accumulating counter during each operational cycle when synchronization occurs.

2. In a computing system as claimed in claim 1, wherein said cost accumulating counter comprises a plurality of counting stages and said permitting means comprises a plurality of coincidence gates connected at the input of selected counting stages, the output of said synchronizing means being connected to the input of said coincidence gates to enable said gates for the passage of said output pulses to said selected stages.

3. In a computing system as claimed in claim 2, wherein said counting stages are decade counters connected in series.

4. In a computing system as claimed in claim 3 further comprising a display connected to the output of said accumulating counter to indicate visually the cost of dispensed fuel.

5. In a computing system as claimed in claim 1, wherein said continuously-cycling computer includes means for generating a signal at the start of each cycle and means for generating a signal at the end of each cycle, and said synchronizing means includes a coincidence circuit connected to be responsive to said start signal and to an incremental volume pulse, a first bistable device connected to the output of said coincidence circuit to be set in a first state at the beginning of a computer cycle and connected to receive the end signal to be set in a second state at the end of a computer cycle.

6. In a computing system as claimed in claim 5, wherein said cost accumulating counter comprises a plurality of counting stages and said permitting means comprises a plurality of coincidence gates connected at the input of selected counting stages, the output of said first bistable device being connected to the input of said coincidence gates to enable said gates for the passage of said output pulses to said selected stages when said bistable device is in said first state.

7. In a computing system as claimed in claim 6, wherein said synchronizing means further comprises a second bistable device connected to be set to a first state by an incremental volume pulse, the output of said second bistable device connected to the input of said coincidence circuit, coincidence being established by the arrival of said start signal when said second bistable device is in its first state, thereby to set said first bistable device to its first state.

8. In a computing system as claimed in claim 7, wherein said first and second bistable devices are flip-flops, and said coincidence circuit is an AND gate.

9. In a computing system as claimed in claim 1, wherein said continuously-cycling computer includes a free-running oscillator, a computer cycle timer responsive to the output of said free-running oscillator for establishing each cycle of said computer, a counter-responsive to said timer for being loaded at the start of each cycle with the electrical signal representative of the established unit volume price, and means responsive to said free-running oscillator for providing said output pulses and for advancing said counter during each computer cycle.

10. In a computing system as claimed in claim 9 wherein said computer further includes a scaler for dividing the frequency of the oscillator by a preset number to provide an operational frequency, said computer-cycle timer being connected to the output of said scaler.

11. In a computing system as claimed in claim 10, wherein said variable establishing means provides a BCD signal equivalent to the established price, and said counter includes a plurality of binary counters, each binary counter connected for being loaded by one of the binary signals forming said BCD signal.

12. In a computing system as claimed in claim 11, wherein said computer further includes a decoder connected to a scaler to provide a plurality of pulse trains each at the operational frequency but noncoincident in time with the other pulse trains, each of said binary counters being responsive to one of said pulse trains so that said binary counters are sequentially loaded at the start of each computer cycle.

13. In a computing system as claimed in claim 12 wherein said providing means comprises a plurality of gates, the input of each gate being connected to be responsive to the output of a respective one of said binary counters and connected to receive a respective one of said pulse trains, the outputs of said gates providing said output pulses, and the output of each of said gates also being connected to the input of its respective binary counter to advance said counter simultaneously with the application of pulses to said permitting means by each such gate.

14. In a computing system as claimed in claim 10 wherein said computer further includes means responsive to said cycle timer for generating a signal at the start of each cycle and means responsive to said cycle timer for generating a signal at the end of each cycle, and said synchronizing means includes a coincidence circuit connected to be responsive to said start signal and to an incremental volume pulse, a first bistable device connected to the output of said coincidence circuit to be set in a first state at the beginning of a computer cycle and connected to receive the end signal to be set in a second state at the end of a computer cycle.

15. In a computing system as claimed in claim 14, wherein said cost accumulating counter comprises a plurality of counting stages and said permitting means comprises a plurality of coincidence gates connected at the input of selected counting stages, the output of said first bistable device being connected to the input of said coincidence gates to enable said gates for the passage of said output pulses to said selected stages when said bistable device is in said first state.

16. In a computing system as claimed in claim 15, further comprising a second bistable device connected to be set to a first state by an incremental volume pulse, the output of said second bistable device connected to the input of said coincidence circuit, coincidence being established by the arrival of said start signal when said second bistable device is in its first state, thereby to set said first bistable device to its first state.

17. In a computing system as claimed in claim 16, wherein said first and second bistable devices are flip-flops, and said coincidence circuit is an AND gate.

* * * * *